United States Patent [19]
Nakajima

[11] Patent Number: 5,149,479
[45] Date of Patent: Sep. 22, 1992

[54] METHOD OF MANUFACTURING MODULAR COVER OF AIR BAG

[75] Inventor: Hideo Nakajima, Shiga, Japan

[73] Assignee: Takata Corporation, Tokyo, Japan

[21] Appl. No.: 648,818

[22] Filed: Jan. 31, 1991

[30] Foreign Application Priority Data

Mar. 6, 1990 [JP] Japan ................................. 2-54294

[51] Int. Cl.⁵ ........................ B28B 7/14; B28B 7/02
[52] U.S. Cl. ................................. 264/163; 264/293; 264/296; 264/328.7
[58] Field of Search ............... 264/293, 296, 328.7, 264/163

[56] References Cited

U.S. PATENT DOCUMENTS

| | | |
|---|---|---|
| 2,578,719 | 12/1951 | Mayer et al. |
| 3,996,329 | 12/1976 | Holland et al. ............... 264/328.7 |
| 4,980,115 | 12/1990 | Hatekayama ................. 264/328.7 |

FOREIGN PATENT DOCUMENTS

| | | |
|---|---|---|
| 3904977 | 1/1990 | Fed. Rep. of Germany . |
| 1173839 | 12/1969 | United Kingdom . |
| 1176813 | 1/1970 | United Kingdom . |
| 1257494 | 12/1971 | United Kingdom . |
| 1314452 | 4/1973 | United Kingdom . |
| 1346892 | 2/1974 | United Kingdom . |
| 2139549 | 11/1984 | United Kingdom . |
| 2191442 | 12/1987 | United Kingdom . |

Primary Examiner—Hubert C. Lorin
Assistant Examiner—A. Y. Ortiz
Attorney, Agent, or Firm—Kanesaka and Takeuchi

[57] ABSTRACT

A resin material is fed into a cavity of a mold provided with a movable member adapted to form a tear-line on the resin material and capable of moving toward, and away from, the mold cavity such that when the mold cavity is filled with the resin material and the mold is closed, the movable member is advanced toward the mold cavity thereby obtaining a modular cover provided with a tear-line having a small thickness and a high degree of strength.

7 Claims, 3 Drawing Sheets

METHOD OF MANUFACTURING MODULAR COVER OF AIR BAG

FIELD OF THE INVENTION AND DESCRIPTION OF PRIOR ART

The present invention relates to a method of manufacturing a modular cover for an air bag and more particularly to an improvement in a method of manufacturing such a type of an air bag cover that is provided with a grooved tear-line, by supplying a resin material into a metallic mold.

As is well known, the air bag device comprises an air bag which develops quickly in an emergency such as a vehicle collision. As shown in FIG. 4, in its normal condition, the air bag 2 is folded and covered with a modular cover 1. It is, for example, retained by a fitting plate 3 called a retainer together with revets, screws or bolts as at 5.

The modular cover 1 is provided with a grooved tear-line 1A for opening the cover when the air bag 2 develops. The tear-line 1A forms of itself a thin portion having a predetermined shape (generally about 0.5-1.0 mm thick) and a strength lower than that of the portion of the cover lying therearound and when the air bag 2 develops, the modular cover 1 opens by tearing along the tear-line 1A.

As an excessively large tensile force is applied on the modular cover at the time of its opening by tearing off, a reinforcing material 6 such as a cloth, metallic wire netting, high-strength synthetic fiber netting is embedded in the cover so that a required tensile strength is applied on the portion of the cover other than the tear-line 1A. In FIG. 4, reference numeral 1B designates a decorative line.

As a material for the above-described modular cover, it has been usual to use an urethane integral skin foam or thermoplastic material and the material has been injected into a mold of a predetermined shape for molding.

However, the conventional method of manufacturing a modular cover for an air bag has had the disadvantage that in order to provide the small-thickness portion of the grooved tear-line, a mold having a projection suitable for forming the tear line is used but since the molding space is small, the flow of the injected resin material is hindered causing a defective molding of the material.

That is, where foam urethane is used as a resin material, a turbulent flow of the original solution takes place around the projection so that the resultant product tends to have voids, pinholes and etc. on both surfaces thereof due to air swallowed up into the mold. Further, at a portion remote from the injection port of the mold there takes place a non-conformity such as thin part or lowering of urethane density.

On the other hand, where a thermoplastic material is used, a blow mark or thin part is formed at the portion of the material corresponding to the projection. In order to prevent such disadvantages, it becomes necessary for the mold to have a plurality of injection ports or to increase the injection pressure and further, the resin materials are limited to those of high fluidity.

Accordingly, due to the fact that the tear-line of the modular air bag cover is required to be sufficiently small in thickness for allowing it to be quickly opened by tearing at the time of development of the air bag while at the same time, it is required to have a strength sufficient for preventing it from being easily teared off due to an external force in the normal condition, a method of manufacturing a modular air bag cover having a small thickness and sufficient strength without causing any defective molding and with a high degree of yield has been strongly desired.

OBJECT AND SUMMARY OF THE INVENTION

An object of the present invention is to provide a method of manufacturing a modular cover for an air bag effectively and with a high degree of yield with the modular cover being provided with a tear-line of excellent property along which the cover is opened by tearing.

That is, the object of the present invention is to provide an air bag module cover manufacturing method by which a modular cover provided with a tear-line which is thin enough for its opening while at the same time, having a strength sufficient for preventing it from opening aimlessly can be obtained efficiently and with a high degree of yield.

The modular air bag cover manufacturing method according to the present invention features that where a resin material is supplied into a mold to produce a modular air bag cover provided with a grooved tear-line, a movable member is formed within the mold so as to move toward and away from the mold cavity so that after the resin material has been supplied into the mold cavity, the portion of the resin material corresponding to the tear-line forming section of the mold is compressed by advancing the movable member. Where a reinforcing material is to be embodied in the product, it is arranged within the mold prior to the supply of the resin material into the mold.

As described above, according to the present invention, the resin material is injected into the mold in a state in which the movable member is withdrawn to provide a comparatively large molding space as the tear-line forming section so that the resin material is efficiently supplied to fill the mold cavity and flows into the section without obstruction.

Then, after the resin material has been supplied, the movable member is advanced to compress it at the tear-line forming section thereby forming a tear-line of a small thickness. Further, since the tear-line thus formed is thin enough to open by tearing at the time of development of the air bag and the resin material filled in the mold cavity sufficiently to avoid the formation of a void, pinhole or blow-mark, it has a sufficient strength to prevent of itself from tearing aimlessly.

For the above reasons, it is possible with the present invention to manufacture a modular air bag cover which has an excellent strength and tear-off property in an efficient manner and with a high degree of yield.

DESCRIPTION OF THE PREFERRED EMBODIMENTS

Preferred embodiments of the present invention will now be described with reference to the accompanying drawings.

Figure 1:
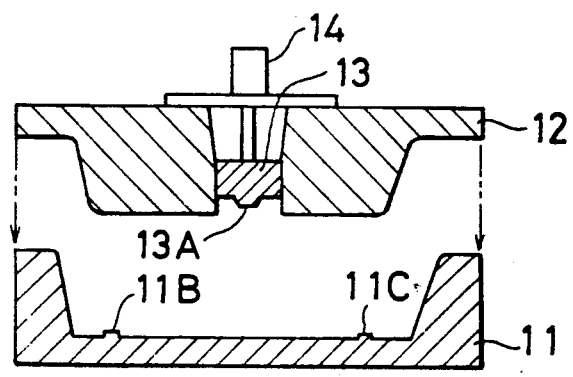
FIG. 1 is a sectional view of a mold used for one embodiment of a modular air bag cover manufacturing method according to the present invention especially in its state prior to supplying a resin material.

For example, where a resin material 16 is molded by a mold comprising a lower die (cavity type) 11 and an upper die (core type) 12 as shown in FIG. 1, the core die 12 is provided, at a position where a tear-line is formed on the material, with a movable die piece 13 which is capable of moving toward and away from a mold cavity in the upper or core die 12. The movable die piece 13 is an elongated member having a projection 13A suitable for forming the above-mentioned tear-line and side flat faces on both sides of the projection 13A. The die piece 13 is movable vertically by a moving means 14. Likewise, the lower or cavity type die 11 is provided with projections 11B and 11C for forming decorative lines, respectively.

Figure 2:
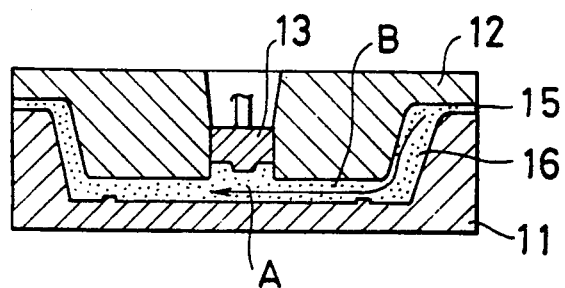
FIG. 2 is a sectional view of the mold of FIG. 1 especially in its state after the resin material has been supplied.

In molding, the movable die piece 13 is held withdrawn from the mold cavity as shown in FIG. 2 and in that state, the mold is closed and the resin material 16 is injected into the cavity from an injection port (gate) 15. In this case, as the movable die piece 13 is held withdrawn, a tear-line forming section A in the mold cavity is comparatively large so that the resin material 16 injected into the cavity flows smoothly (in the direction of the arrow B) without being hindered by the tear line forming projection 13A and pervades into the cavity sufficiently. By the way, where necessary, a reinforcing member such as a cloth, metallic wire netting, high-strength synthetic fiber netting may be arranged within the mold in advance. Then, after the resin material 16 has been sufficiently injected into the mold, the movable die piece 13 is advanced to press the portion of the resin material corresponding to the tear-line forming section A and all the resin material 16 is hardened whereby a thin and high-strength modular cover having a tear-line of high resin charging rate is obtained as the resin material is pressed between the lower die 11 and the tear-line forming projection 13A of the movable die piece 13 so that a thin and high-strength modular cover having a tear-line with high resin density is obtained.

According to the method of the present invention, where a thermoplastic material is used, there is sometimes a case in which molding becomes difficult because of the necessity of a pressure for moving the movable die piece 13. On the other hand, where a foam urethane material is used, since the two-liquid reaction time required for the integral skin molding of the urethane resin is about five minutes in general, the molding can be performed easily by moving the movable die piece within a period of time in which the material begins to foam. It is also possible to use thermosetting resin materials other than urethane.

Figure 3:
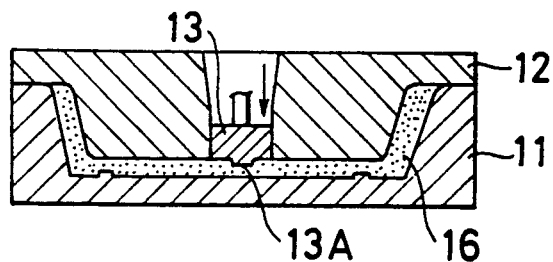
FIG. 3 is a sectional view of the mold of FIG. 1 especially in its state in which the resin material is compressed for molding.
Figure 4:
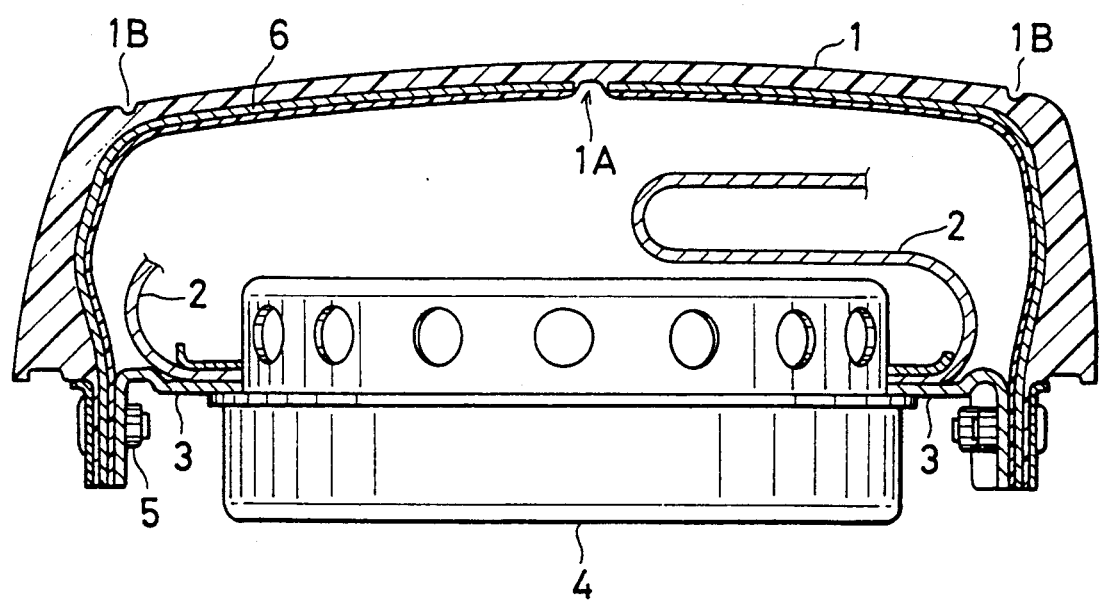
FIG. 4 is a sectional view of an air bag device attached with a modular cover manufactured by the method of the present invention.
Figure 5:
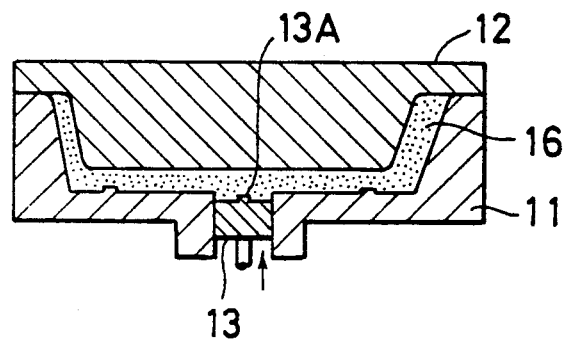
FIGS. 5 and 6 are sectional views of molds used for other embodiments of the method of the present invention.
Figure 6:
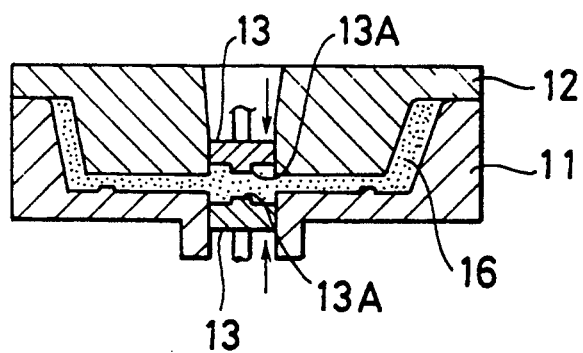

It should be noted that the method described above with reference to FIGS. 1 through 3 is only one embodiment of the present invention and the present invention is therefore not limited thereto. For example, the movable die piece 13 may be attached to the cavity type die as shown in FIG. 5 or two movable die pieces of the above-described type may be attached to both the core and cavity dies as shown in FIG. 6. Note that in FIGS. 5 and 6, like parts are designated by like reference numerals with respect to FIGS. 1 through 3.

What is claimed is:

1. A method of manufacturing a modular cover for an air bag comprising,
    preparing a mold formed of a stationary die, a movable die movable toward the stationary die to define a cavity between the two dies and two tear-line impressing movable members attached to the respective dies and movable forward and rearward with respect to the cavity formed between the two dies, each movable member having an elongated projection for forming a tear-line and flat side faces on both sides of the elongated projection;
    withdrawing the movable members away from the cavity of the mold to form extra spaces adjacent the cavity;
    supplying a resin material into the cavity of the mold to fill the resin material in the cavity and the extra spaces;
    moving the respective movable members toward the cavity to positions where the flat side faces on both sides of the respective elongated projections are flush with respective outer surfaces of the cavity and the elongated projections project into the cavity so that tear-lines are formed in the resin material supplied into the mold and the resin material in the extra spaces is supplied to an area around the tear-lines with compression to provide enough density at the area around the tear-lines;
    hardening the resin material within the cavity of the mold; and
    separating the hardened resin material from the mold thereby obtaining the modular cover provided with the tear-lines on both sides of the modular cover with sufficient strength.

2. A method according to claim 1, further comprising arranging a reinforcing member within said mold prior to supplying the resin material into said mold so that the resultant modular cover is reinforced with said reinforcing member.

3. A method according to claim 1, wherein said resin material is a thermosetting resin.

4. A method according to claim 1, wherein said resin material is a urethane resin.

5. A method according to claim 1, wherein said resin material is foam urethane.

6. A method according to claim 1, wherein said movable member is moved forward within five minutes after said resin material has been supplied into the cavity of said mold.

7. A method according to claim 2, wherein said reinforcing member is at least a kind selected from a cloth, metallic wire netting and synthetic fiber netting.

* * * * *